(12) United States Patent
Hasegawa

(10) Patent No.: US 7,152,489 B2
(45) Date of Patent: Dec. 26, 2006

(54) ARRESTING DEVICE, AND SNAP MEMBER REMOVAL FORCE MEASURING APPARATUS

(75) Inventor: Kenji Hasegawa, Tokyo (JP)

(73) Assignee: YKK Corporation, Tokyo (JP)

( * ) Notice: Subject to any disclaimer, the term of this patent is extended or adjusted under 35 U.S.C. 154(b) by 12 days.

(21) Appl. No.: 10/516,040

(22) PCT Filed: May 29, 2003

(86) PCT No.: PCT/JP03/06745

§ 371 (c)(1),
(2), (4) Date: Nov. 29, 2004

(87) PCT Pub. No.: WO03/102525

PCT Pub. Date: Dec. 11, 2003

(65) Prior Publication Data

US 2005/0172730 A1    Aug. 11, 2005

(30) Foreign Application Priority Data

May 30, 2002 (JP) .............................. 2002-157736

(51) Int. Cl.
*G01L 5/00* (2006.01)
(52) U.S. Cl. ............................ 73/856; 73/830; 73/831; 73/856; 73/862.01
(58) Field of Classification Search ............. 73/862.01, 73/859, 830, 856, 831
See application file for complete search history.

(56) References Cited

U.S. PATENT DOCUMENTS 4,697,601 A * 10/1987 Durkee et al. .............. 600/590
4,773,276 A * 9/1988 Baruffalo ................. 73/862.01
5,798,467 A   8/1998 Hasegawa
6,240,788 B1 * 6/2001 Balestracci ............. 73/862.01
6,662,666 B1 * 12/2003 Hasegawa .................... 73/831

FOREIGN PATENT DOCUMENTS

| JP | 05-177476 | 7/1993 |
| JP | 06-126569 | 5/1994 |
| JP | 9-37811   | 2/1997 |

\* cited by examiner

Primary Examiner—Edward Lefkowitz
Assistant Examiner—Freddie Kirkland, III
(74) Attorney, Agent, or Firm—Everest Intellectual Property Law Group; Michael S. Leonard

(57) ABSTRACT

A constraining device comprises a plurality of jaws 34 adapted to constrain the sides of an object of constraint, support shafts 35 rotatably supporting the respective jaws so as to allow the jaws to spread and become closed, first biasing means 36 adapted to bias the respective jaws to become closed, a jaw opening/closing drive member 62 arranged at the center of the jaws so as to move close to and away from the object of constraint and press the base end portions of the jaws to drive the jaws when moved in a first direction, a second biasing means 63 adapted to bias the jaw opening/closing drive member in the first direction in order to close the jaws and a temporary holding section 66 arranged at the jaw opening/closing drive member and adapted to be engaged with the base end portions of the jaws to block the jaw opening/closing drive member against moving in the first direction but allow the jaw opening/closing drive member to move in the first direction when force exceeding a predetermined level is applied to the jaw opening/closing drive member in the first direction.

17 Claims, 12 Drawing Sheets

ARRESTING DEVICE, AND SNAP MEMBER REMOVAL FORCE MEASURING APPARATUS

TECHNICAL FIELD

This invention relates to a constraining device and also to a measuring instrument for detaching force of snap member. More specifically, the present invention relates to a constraining device for constraining a member of constraint from around and a measuring instrument for detaching force of snap member for measuring the necessary force for detaching a snap member attached to a piece of fabric by means of the constraining device.

BACKGROUND ART

Snap fasteners are used on garments to a large extent. A snap fastener has a structure in which a female snap member that is also referred to as socket member and a male snap member that is also referred to as stud (which are collectively referred to as snap members) are resiliently engaged with and disengaged from each other. The snap members are attached to the oppositely disposed sides of respective pieces of fabric so as to face each other.

For examples, as shown in FIG. 12, a female snap member 1 and a male snap member 2 are attached to the oppositely disposed sides of pieces of fabrics 5, 6 by means of respective attaching members 3, 4 that are referred to as prong members from the other sides of the pieces of fabric.

If a snap member that is attached to the fabric of garments is easily detached, an infant can swallow the snap member and/or the attaching member. Therefore, it must be guaranteed that the force for detaching a snap member exceeds a predetermined level. Thus, in sewing factories, the force required for detaching a snap member is tested so as to keep the snap members produced from the factory are under control and make sure that force exceeding a predetermined level is required for detaching each of them.

For this reason, sewing companies in many countries adopt the European Standard "BS EN71-1: Safety of Toy, Mechanical and Physical Properties", which defines that the force that can detach a snap member needs to be equal to or greater than "90N 10 seconds".

Known gauges for measuring the force required for detaching a snap member typically have a structure as shown in FIGS. 9 through 11.

The gauge comprises a base 10, a stage 11 arranged on the top surface of the base 10 and adapted to receive thereon a snap member attached to a piece of fabric and placed on it, a means for pressing the fabric 21 adapted to press the fabric around the snap placed on the stage 11, a constraining means 31 for constraining the sides of the snap member, a pulling means 41 for pulling the constraining means 31 constraining the snap member away (substantially vertically upward) from the means for pressing the fabric 21 and a gauging means 51 for gauging the pulling force of the pulling means 41.

The stage 11 includes a support table 12 rigidly secured to the top surface of the base 10, a support block 14 rigidly secured to the support table 12 by way of a support bolt 13 and a die 16 supported by the support block 14 by way of a resilient spring section 15 formed by laying a plurality of leaf springs, every other of which is laid upside down. A snap member attached to a piece of fabric is placed on the top surface of the die 16.

The means for pressing the fabric 21 includes a support member 22 standing upright from the support block 14, a fabric presser arm 24 supported at a middle section thereof by the support member 22 at the top end of the latter by way of a support shaft 23 so as to be able to swing around the shaft and press the fabric at an annular front end part thereof, a screw shaft 25 horizontally screwed into a middle section of the support member 22, a fabric presser arm regulating dial 26 engaged with the screw shaft 25, a link holder 28 rotatably supported by the fabric presser arm regulating dial 26 by way of a bearing 27 and a link 29 linking the link holder 28 and the rear end of the fabric presser arm 24.

The constraining means 31 includes a threaded bolt 32 linked to a chain 52 extending downward from the gauging means 51 by way of a joint 53, a jaw support plate 33 arranged at the lower end of the threaded bolt 32, three jaws 34 arranged to surround the snap member and having at the front ends thereof respective engaging portions 34A adapted to be engaged with the sides of the snap member, support shafts 35 rotatably holding middle portions of the jaws 34 to the jaw support plate 33 so as to allow the front end engaging portions 34A of the jaws 34 to spread and become closed, turning/biasing means 36 for turning/biasing the respective jaws 34 around the corresponding respective support shafts 35 so as to operate as fulcrums and open the front end engaging portions 34A of the jaws 34 and a cam section 37 arranged so as to abut the base end portions of the jaws 34 and turn the jaws 34 around the respective support shafts 35 in order to close the front end engaging portions 34A of the jaws 34 when it is engaged with the threaded bolts 32 and driven to move downward. The turning/biasing means 36 comprise respective coil springs arranged respectively at the outsides of the corresponding jaws 34. A jaw regulating dial 37A is arranged on the cam portion 37 as an integral part of the latter.

The pulling means 41 includes an upright frame 42 standing on the top surface of the base 10, a support frame 43 rigidly secured to an upper part of the upright frame 42, a gauge support plate 45 vertically and slidably fitted to the support frame 43 by way of a sliding member 44 and having the gauging means 51 fitted to the front side thereof and a pulling up mechanism 46 for pulling up the gauge support plate 45. The pulling up mechanism 46 comprises a top plate 47 arranged rectangularly to the top end of the gauge support plate 45, a threaded bolt 48 screwed vertically into the support frame 43 to hold the top plate 47 and a wheel 49 rigidly secured to the top end of the threaded bolt 48.

The gauging means 51 comprises a commercially available tensile force measuring gauge 51A.

The necessary force for detaching a snap member is measured by means of the above described configuration in a manner as described below.

When the snap member attached to a piece of fabric is placed on the top surface of the die 16, the jaw regulating dial 37A is rotated so as to pinch and constrain the snap member at the sides thereof by means of the three jaws 34.

At the same time, the fabric presser arm regulating dial 26 is rotated so as to press the fabric by means of the annular front end part of the fabric presser arm 24. Then, the wheel 49 is rotated to pull up the snap member that is constrained by the jaws 34 slowly by means of the tensile force measuring gauge 51A and obtain the reading of the tensile force measuring gauge 51A. If the snap member is not detached from the fabric beyond a predetermined level of pulling force, it is guaranteed that the snap member withstands a predetermined level of force trying to detach it from the fabric. When the snap member is pulled until it is detached from the fabric, the necessary force for detaching it from the fabric is observed.

Generally, when measuring the force required for detaching a snap member, it is necessary to constrain the snap member by force not less than 200N because the force required for detaching a snap member is normally about 200N.

With conventional measuring instrument for detaching force of snap members, the operator operates the jaw regulating dial 37A by rotating it to constrain or release the snap member. Such a practice is accompanied by the following problems.

(1) When measuring the snap member detaching force, the jaw regulating dial 37A can be tightened excessively in fear of accidental release of the snap member from the jaws 34. Then, a large force is required to loosen the jaw regulating dial 37A that has been tightened excessively after measuring the snap member detaching force. However, since the operator manually rotates the jaw regulating dial 37A, the force applied to it cannot be very large. For this reason, the operation of measuring the snap member detaching force is a burden to the operator.

(2) As the snap member is constrained by excessive force, the front ends of the jaws 34 can be driven between the snap member and the fabric to separate the snap member from the fabric and the snap member can be deformed. There can be occasions where the snap member detaching force is not correctly measured due to such phenomena.

Additionally, with conventional measuring instrument for detaching force of snap members, the operator operates the fabric presser arm regulating dial 26 by rotating it to press or release the fabric. Such a practice is accompanied by the following problems.

(3) When measuring the snap member detaching force, the fabric presser arm regulating dial 26 can be tightened excessively in fear of accidental detachment of the fabric from the fabric presser arm 24. Then, a large force is required to loosen the fabric presser arm regulating dial 26 that has been tightened excessively after measuring the snap member detaching force. However, since the length of the fabric presser arm 24 from the fulcrum to the link side end is shorter than the length thereof from the fulcrum to the die side end, a large force is required for the operator to operate the fabric presser arm regulating dial 26 to rotate it.

(4) The fabric presser arm 24 is made longer between the fulcrum and the die side end thereof than between the fulcrum and the end thereof located close to the fabric presser arm regulating dial 26 so that the fabric presser arm 24 can be rotated by a necessary angle by rotating the fabric presser arm regulating dial 26 only to a small extent in view of the fact that it is necessary to secure a gap of about 10 mm between the fabric presser arm 24 and the die 16 when the snap member that is attached to the fabric is placed on the die 16. Therefore, the operator is required to exert a large force when rotating the fabric presser arm regulating dial 26. For this reason, the operation of measuring the snap member detaching force is a burden to the operator.

Thus, the first object of the present invention is to provide a constraining device that can reliably constrain a member of constraint without putting a burden on the operator.

The second object of the present invention is to provide a measuring instrument for detaching force of snap member that can lessen the load of the operator and accurately measure the necessary force for detaching a snap member.

DISCLOSURE OF THE INVENTION

According to the invention, there is provided a constraining device for constraining an object of constraint, characterized by comprising: a support member; a plurality of jaws adapted to be arranged around said object of constraint and having at the front ends thereof respective engaging portions to be engaged with the sides of the object of constraint; support shafts rotatably supporting the respective jaws at middle portions of the latter so as to allow the front end engaging portions of the jaws to spread and become closed; first biasing means for biasing the respective jaws to rotate around the respective support shafts operating as fulcrums so as to bring the front end engaging portions of said jaws into an open state; a jaw opening/closing drive member arranged internally relative to said plurality of jaws and adapted to move so as to make the jaws contact or release said object of constraint and rotate the jaws so as to press the base end portions of the jaws and close the front end engaging portions of the latter when moved in a direction of causing the jaws to contact the object of constraint or in a direction of causing the jaws to release the object of constraint; and a second biasing means for biasing said jaw opening/closing drive member in a first direction so as to bring the front end engaging portions of the plurality of jaws into a closed state.

With the above described configuration, the jaw opening/closing drive member and the jaws are temporarily held so that the jaw opening/closing drive member is blocked against moving in the first direction relative to the jaws. While one or more than one temporary holding sections may be used to temporarily block the movement of the jaw opening/closing drive member, the frictional force generated on the sliding surfaces of the jaws and the jaw opening/closing drive member may alternatively be used.

When force exceeding a predetermined level is applied to the jaw opening/closing drive member in this state, the temporarily blocked state is released so that the jaw opening/closing drive member is biased to move in the first direction by the biasing force of the second biasing means. Then, the jaw opening/closing drive member presses the base end portions of the jaws to rotate the plurality of jaws so as to close the front end engaging portions of the latter around the respective support shafts that operate as fulcrums. As a result, the front end engaging portions of the jaws are closed to constrain the object of constraint at its sides.

To release the object of constraint from the jaws, the jaw opening/closing drive member is driven to move in the opposite direction, or the second direction. At this time, since the biasing force of the second biasing means that presses the jaw opening/closing drive member in the first direction is reduced, only a small force is required to drive the jaw opening/closing drive member in the opposite direction. Thereafter, since the force driving the jaw opening/closing drive member gathers momentum, the jaw opening/closing drive member passes by the above described temporarily blocked position with the little force and returns to the state before constraining the object of constraint.

Therefore, the operator is only required to apply force that exceeds a predetermined level to the jaw opening/closing drive member in the first direction when constraining the object of constraint and only a small force to the jaw opening/closing drive member when releasing the object of constraint. Thus, the operator can reliably constrain and release the object of constraint without bearing any burden.

In a constraining device according to the invention, preferably either the jaw opening/closing drive member is provided with a temporary holding section adapted to be engaged with the base end portions of the jaws or the jaws are provided with respective temporary holding sections adapted to be engaged with the front end section of the jaw opening/closing drive member so as to block the movement of the jaw opening/closing drive member in the first direction caused by the second biasing means but become disengaged to allow the movement of the jaw opening/closing drive member in the first direction when force exceeding a predetermined level is applied to the jaw opening/closing drive member in the first direction.

With such a configuration, the jaw opening/closing drive member and the jaws are reliably held to a predetermined position by the temporary holding section.

More specifically, the temporary holding section and the base end portions of the jaws are disengaged from each other when force exceeding the predetermined level is applied to the jaw opening/closing drive member in the first direction in a state where the jaw opening/closing drive member is blocked against moving in the first direction by the temporary holding section so that consequently the jaw opening/closing drive member is driven to move in the first direction by the biasing force of the second biasing means. Then, the jaw opening/closing drive member presses the base end portions of the jaws to turn the jaws around the respective support shafts that operate as fulcrums in the direction for closing the front end engaging portions of the jaws. As a result, the front end engaging portions of the jaws constrains the sides of the object of constraint as they are closed.

When the object of constraint is released from the jaws, the force driving the jaw opening/closing drive member gathers momentum and therefore the temporary holding section can pass over the base end portions of the jaws with little force. After the temporary holding section passes over the base end portions of the jaws, the operator releases the jaw opening/closing drive member and then the temporary holding section of the jaw opening/closing drive member is held by the base end portions of the jaws to return to the state before constraining the object of constraint.

Thus, the temporary holding section reliably and temporarily holds the jaw opening/closing drive member and the state before constraining the object of constraint can be defined at a predetermined position.

The temporary holding section of a constraining device according to the invention may have any configuration so long as it can temporarily block the movement of the jaw opening/closing drive member in the first direction caused by the second biasing means and release the jaw opening/closing drive member when a light force is applied thereto. For example, it may be a stepped holding section that is formed at the side of the jaw opening/closing drive member facing the first direction and adapted to be engaged with the base end portions of the jaws.

Preferably, the jaw opening/closing drive member has a tapered section whose diameter is increased along the direction opposite to the first direction from the temporary holding section. With a jaw opening/closing drive member having such a tapered section can be prepared very easily so as to be smoothly driven in the first direction by the second biasing means.

The angle of the tapered section is preferably between 10 and 80 degrees. When the angle of the tapered section is between 10 and 80 degrees, the component of force that is applied to the tapered section by the base end portions of the jaws and directed in the second direction (opposite to the first direction) is small and hence the object of constraint can hardly be released from the jaws.

In a constraining device according to the invention, preferably the member holding the base end side of the second biasing means and the jaw opening/closing drive member are provided with respective flanges that can be operated by one hand in a direction approaching the object of constraint to compress the second biasing means.

With this configuration, the operation of releasing the object of constraint from the jaws can be conducted by one hand to effectively improve the efficiency of operation.

According to the invention, there is provided a measuring instrument for detaching force of snap member, characterized by comprising: a means for pressing the fabric for pressing a piece of fabric attaching a snap member around the snap member; a constraining means for constraining the sides of the snap member; a pulling means for pulling at least either the constraining means or the means for pressing the fabric in the direction separating the constraining means constraining the snap member and the means for pressing the fabric; and a gauging means for gauging the pulling force of the pulling means; the constraining means having: a support member; a plurality of jaws adapted to be arranged around the snap member and having at the front ends thereof respective engaging portions to be engaged with the sides of the snap member; support shafts rotatably supporting the respective jaws at middle portions of the latter so as to allow the front end engaging portions of the jaws to spread and become closed; first biasing means for biasing the respective jaws to rotate around the respective support shafts operating as fulcrums so as to bring the front end engaging portions of the jaws into an open state; a jaw opening/closing drive member arranged internally relative to the plurality of jaws and adapted to move so as to make the jaws contact or release the object of constraint and rotate the jaws so as to press the base end portions of the jaws and close the front end engaging portions of the latter when moved in a direction of causing the jaws to contact the object of constraint or in a direction of causing the jaws to release the object of constraint; and a second biasing means for biasing the jaw opening/closing drive member in a first direction so as to bring the front end engaging portions of the plurality of jaws into a closed state.

When the force required for detaching a snap member from the fabric attaching the snap member by means of the above described configuration, firstly the fabric is held around the snap member by the means for pressing the fabric and the peripheral side of the snap member is constrained by the constraining means. Then, the jaw opening/closing drive member and the jaws are held temporarily to leave the jaw opening/closing drive member in a state where it is blocked against moving in the first direction.

In this state, the jaw opening/closing drive member that is temporarily held is released when force exceeding the predetermined level is applied to the jaw opening/closing drive member in the first direction so that consequently the jaw opening/closing drive member is driven to move in the first direction by the biasing force of the second biasing means. Then, the jaw opening/closing drive member presses the base end portions of the jaws to turn the jaws around the respective support shafts that operate as fulcrums in the direction for closing the front end engaging portions of the jaws. As a result, the front end engaging portions of the jaws constrain the sides of the snap member so that the snap member is constrained. Therefore, the operator is only required to apply force that exceeds a predetermined level to the jaw opening/closing drive member in the first direction when constraining the snap member. Thus, the operator can reliably constrain the snap member without bearing any burden.

Subsequently, at least either the constraining means constraining the snap member or the means for pressing the fabric is pulled by the pulling means in the direction of separating them. Then, the pulling force of the pulling means is gauged by the gauging means.

When releasing the snap member held by the jaws after the operation of gauging the necessary force for detaching the snap member, the jaw opening/closing drive member is driven to move in the second direction. Since the biasing force of the second biasing means that presses the jaw opening/closing drive member in the first direction is weakened at this time, only a small force is required for driving the jaw opening/closing drive member in the second direction. Thereafter, since the force driving the jaw opening/closing drive member gather momentum, it passes over the above described temporary holding position to return to the state before constraining the snap member.

Thus, the load of the operator is reduced and, since the snap member is not constrained by unnecessarily excessive force, the necessary force for detaching the snap member is measured accurately.

In a measuring instrument for detaching force of snap member according to the invention, preferably either the jaw opening/closing drive member is provided with a temporary holding section adapted to be engaged with the base end portions of the jaws or the jaws are provided with respective temporary holding sections adapted to be engaged with the front end section of the jaw opening/closing drive member so as to block the movement of the jaw opening/closing drive member in the first direction caused by the second biasing means but become disengaged to allow the movement of the jaw opening/closing drive member in the first direction when force exceeding a predetermined level is applied to the jaw opening/closing drive member in the first direction.

With such a configuration, the jaw opening/closing drive member and the jaws are reliably held to a predetermined position by the temporary holding section.

More specifically, the temporary holding section and the base end portions of the jaws are disengaged from each other when force exceeding the predetermined level is applied to the jaw opening/closing drive member in the first direction in a state where the jaw opening/closing drive member is blocked against moving in the first direction by the temporary holding section so that consequently the jaw opening/closing drive member is driven to move in the first direction by the biasing force of the second biasing means. Then, the jaw opening/closing drive member presses the base end portions of the jaws to turn the jaws around the respective support shafts that operate as fulcrums in the direction for closing the front end engaging portions of the jaws. As a result, the front end engaging portions of the jaws constrains the sides of the object of constraint as they are closed.

When the object of constraint is released from the jaws, the force driving the jaw opening/closing drive member gathers momentum and therefore the temporary holding section can pass over the base end portions of the jaws with little force. After the temporary holding section passes over the base end portions of the jaws, the operator releases the jaw opening/closing drive member and then the temporary holding section of the jaw opening/closing drive member is held by the base end portions of the jaws to return to the state before constraining the object of constraint.

Thus, the temporary holding section reliably and temporarily holds the jaw opening/closing drive member and the state before constraining the object of constraint can be defined at a predetermined position.

The temporary holding section of a measuring instrument for detaching force of snap member according to the invention may have any configuration so long as it can temporarily block the movement of the jaw opening/closing drive member in the first direction caused by the second biasing means and release the jaw opening/closing drive member when a light force is applied thereto. For example, it may be a stepped holding section that is formed at the side of the jaw opening/closing drive member facing the first direction and adapted to be engaged with the base end portions of the jaws.

Preferably, the jaw opening/closing drive member has a tapered section whose diameter is increased toward the direction opposite to the first direction from the temporary holding section. With a jaw opening/closing drive member having such a tapered section can be prepared very easily so as to be driven in the first direction by the second biasing means.

The angle of the tapered section is preferably between 10 and 80 degrees. When the angle of the tapered section is between 10 and 80 degrees, the component of force that is applied to the tapered section by the base end portions of the jaws and directed in the second direction (opposite to the first direction) is small and hence the snap member is not released from the jaws when the snap member detaching force is as large as 200N. Therefore, this configuration provides an advantage that the gauging operation can be conducted safely.

In a measuring instrument for detaching force of snap member according to the invention, preferably the member holding the base end side of the second biasing means and the jaw opening/closing drive member are provided with respective flanges that can be operated by one hand in a direction approaching the object of constraint to compress the second biasing means.

With this configuration, the operation of releasing the object of constraint from the jaws can be conducted by one hand to effectively improve the efficiency of operation.

In a measuring instrument for detaching force of snap member according to the invention, the means for pressing the fabric preferably has a fabric presser arm adapted to press the fabric at the front end thereof, a support shaft supporting the fabric presser arm at a middle section of the arm so as to allow the latter to swing, a rotary shaft held in parallel with the support shaft and having a lever and a cam arranged at the rotary shaft so as to swing the base end of the fabric presser arm around the support shaft that operates as fulcrum according to the operation of turning the lever.

In another aspect of the invention, there is provided a measuring instrument for detaching force of snap member comprising: a means for pressing the fabric for pressing a piece of fabric attaching a snap member around the snap member; a constraining means for constraining the sides of the snap member; a pulling means for pulling at least either the constraining means or the means for pressing the fabric in the direction separating the constraining means constraining the snap member and the means for pressing the fabric; and a gauging means for gauging the pulling force of the pulling means; the means for pressing the fabric having: the fabric presser arm adapted to press the fabric at the front end thereof; a support shaft supporting the fabric presser arm at a middle section of the arm so as to allow the latter to swing; a rotary shaft held in parallel with the support shaft and having a lever; and a cam arranged at the rotary shaft so as to swing the base end of the fabric presser arm around the support shaft that operates as fulcrum according to the operation of turning the lever.

With the above described configuration, as the lever is operated to turn, the rotary shaft is rotated with the lever. Then, the cam arranged at the rotary shaft causes the base end of the fabric presser arm to swing around the support shaft that operates as fulcrum. As a result, the front end of the fabric presser arm presses the fabric. Thus, the fabric is held by a light force to consequently lessen the load of the operator.

In a measuring instrument for detaching force of snap member according to the invention, the cam of the means for pressing the fabric preferably has a stopper section adapted to abut the base end of the fabric presser arm when the fabric presser arm is caused to swing in the direction for pressing the fabric and the direction of force in which the base end of the fabric presser arm pushes the cam substantially agrees with the direction of the rotary shaft when the stopper section abuts the base end of the fabric presser arm.

With the above described configuration, none of the lever, the rotary shaft and the cam return to the respective original positions if the operator's hand releases the lever because the direction of force in which the base end of the fabric presser arm pushes the cam substantially agrees with the direction of the rotary shaft when the stopper section of the cam abuts the base end of the fabric presser arm. Therefore, the fabric is reliably held by the front end of the fabric presser arm.

Preferably, a measuring instrument for detaching force of snap member according to the invention further comprises a die adapted to press the fabric between itself and the front end of the fabric presser arm and a resilient member supporting the die so as to allow the die to be resiliently displaced in the direction of pressing the fabric, the cam being so profiled that it abuts the base end of the fabric presser arm before the stopper section abuts the base end of the fabric presser arm and the fabric presser arm slightly swings in the opposite direction when the stopper section abuts the base end of the fabric presser arm.

With the above described configuration, a measuring instrument for detaching force of snap member according to the invention can be applied to a variety of fabrics having different thicknesses by using a resilient member that supports the die. Additionally, as the cam firstly abuts the base end of the fabric presser arm, the resilient member supporting the die is compressed so that the fabric presser arm is made to swing in the same direction. Thus, the fabric is pushed more tightly. As the cam rotates further, the resilient member supporting the die is extended so that the stopper section of the cam abuts the base end of the fabric presser arm. As a result, the force pushing the lever is reduced before the stopper section abuts the base end of the fabric presser arm, the operator can feel that the fabric presser arm is brought to the right position.

BEST MODE FOR CARRYING OUT THE INVENTION

Now, the present invention will be described by referring to the accompanying drawings that illustrate an embodiment of the invention.

Figure 1:
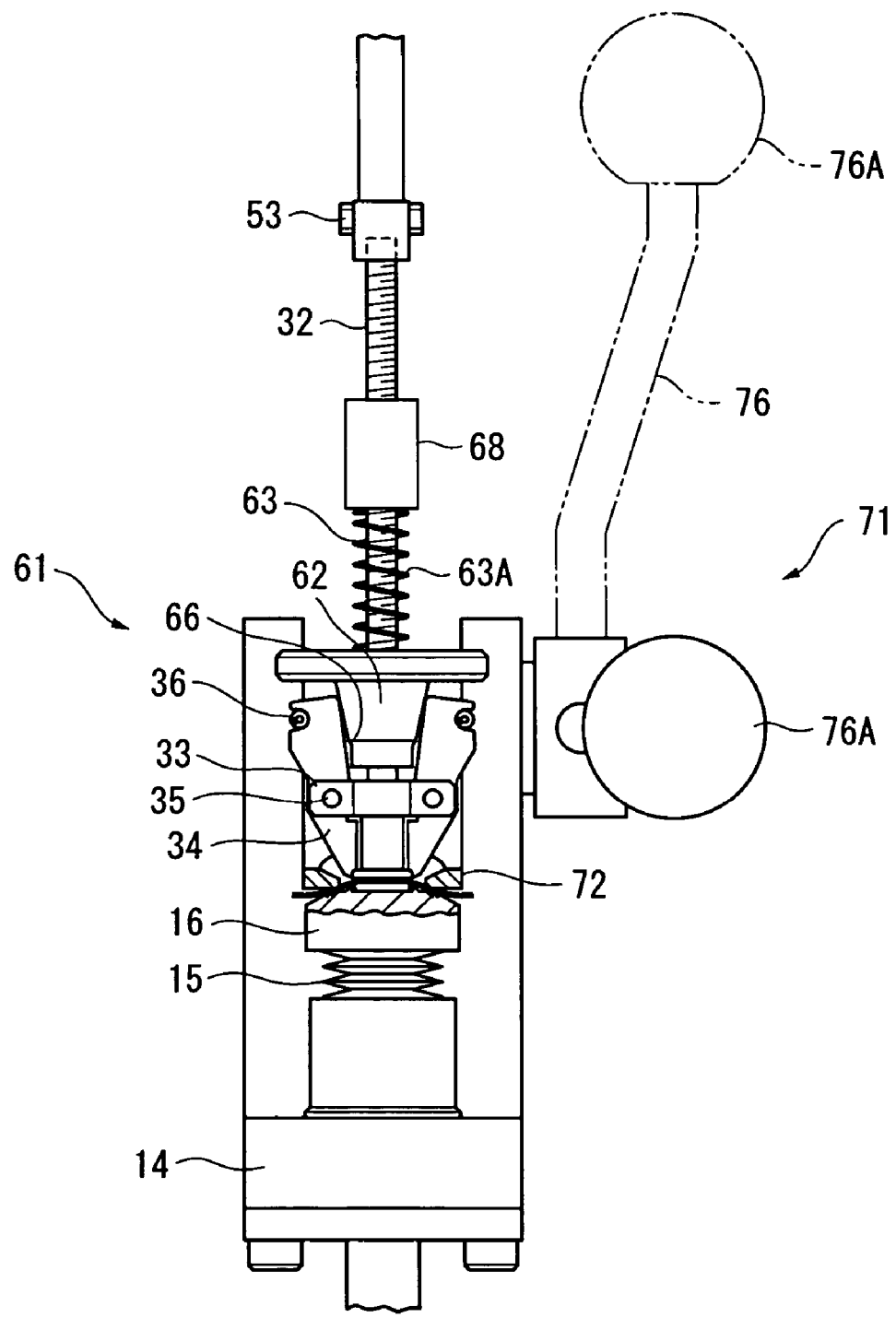
FIG. 1 is a schematic front view of an embodiment of the invention, illustrating a principal part thereof.
Figure 2:
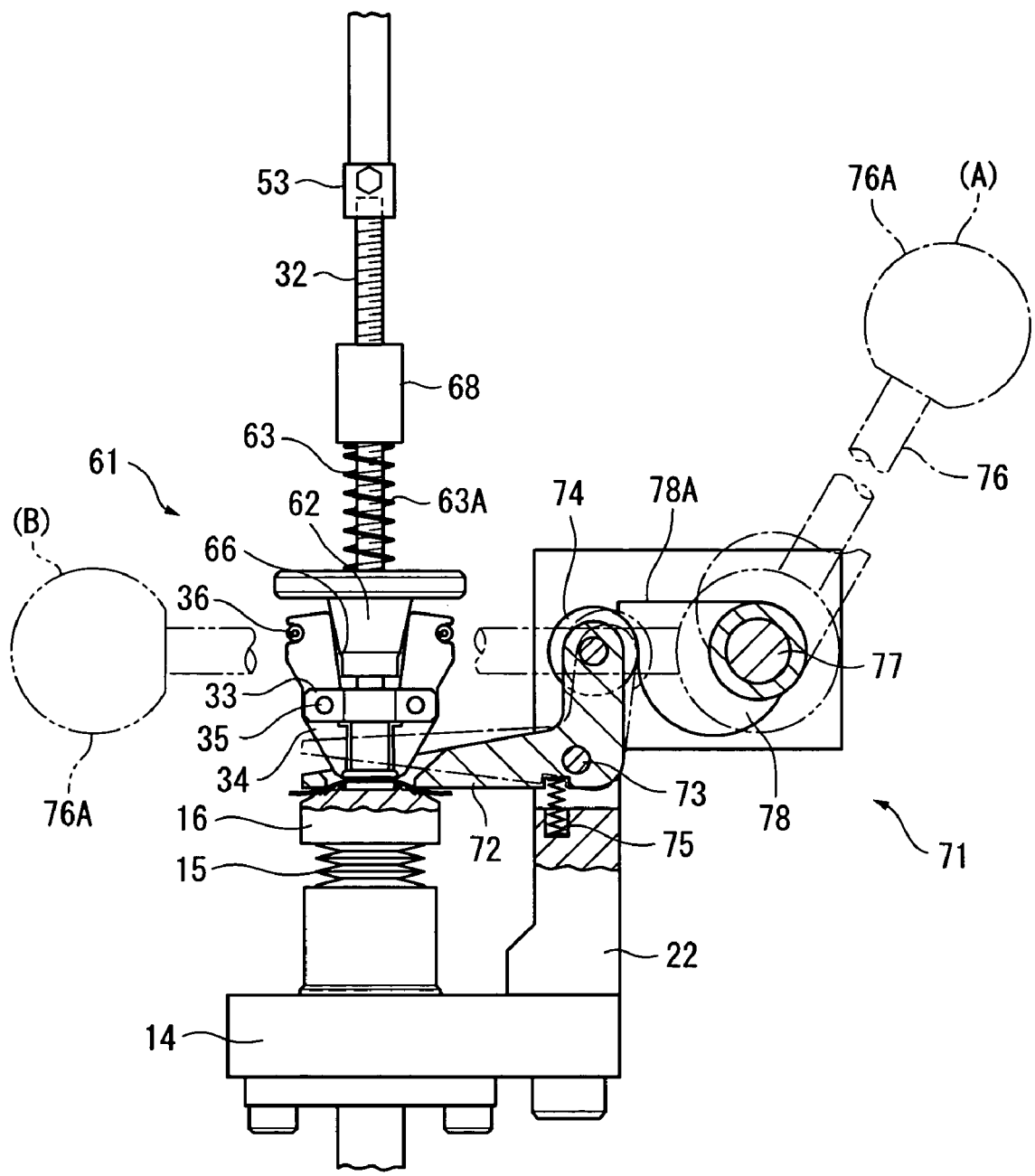
FIG. 2 is a schematic lateral view of the embodiment of FIG. 1.
Figure 9:
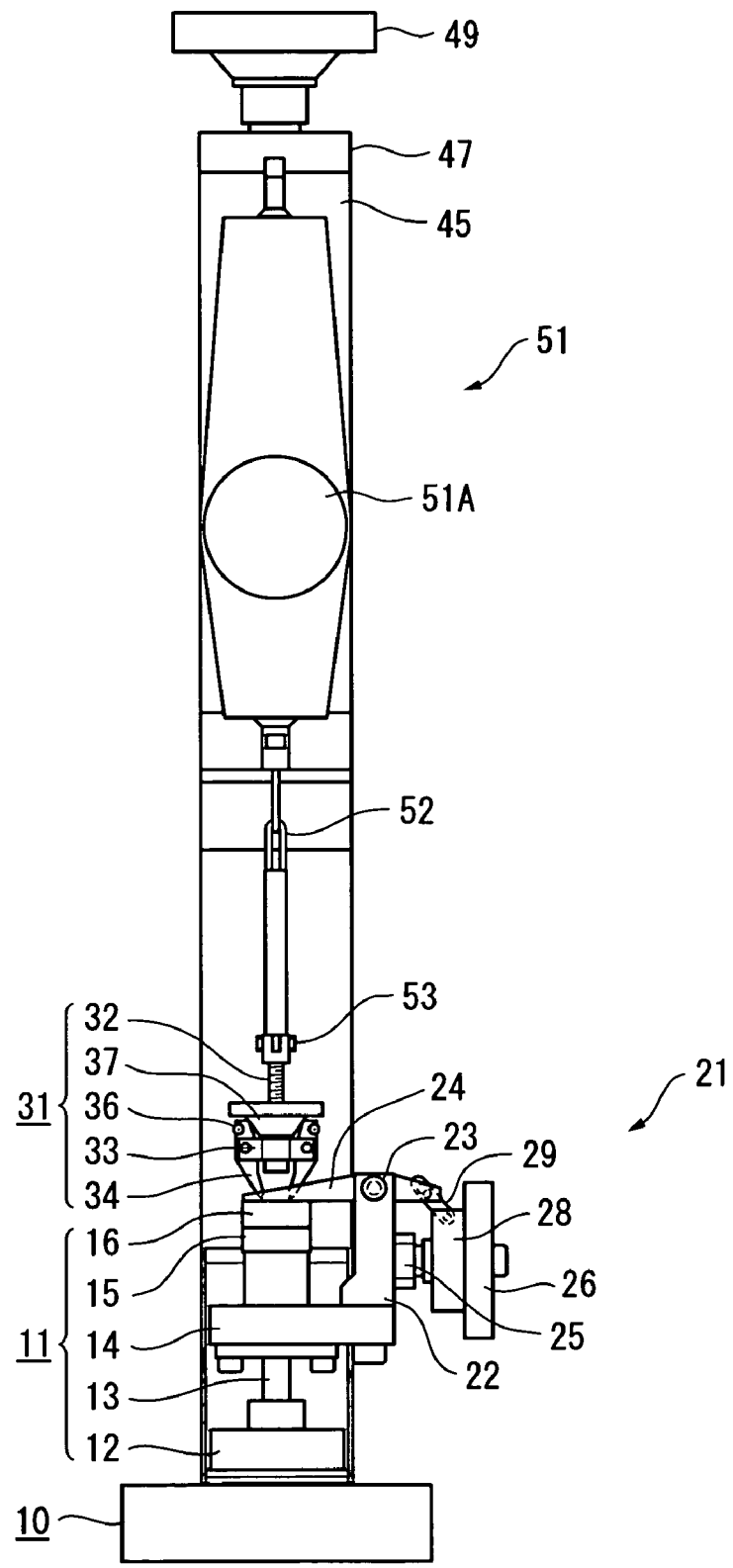
FIG. 9 is a schematic plan view of a known measuring instrument for detaching force of snap member.
Figure 10:
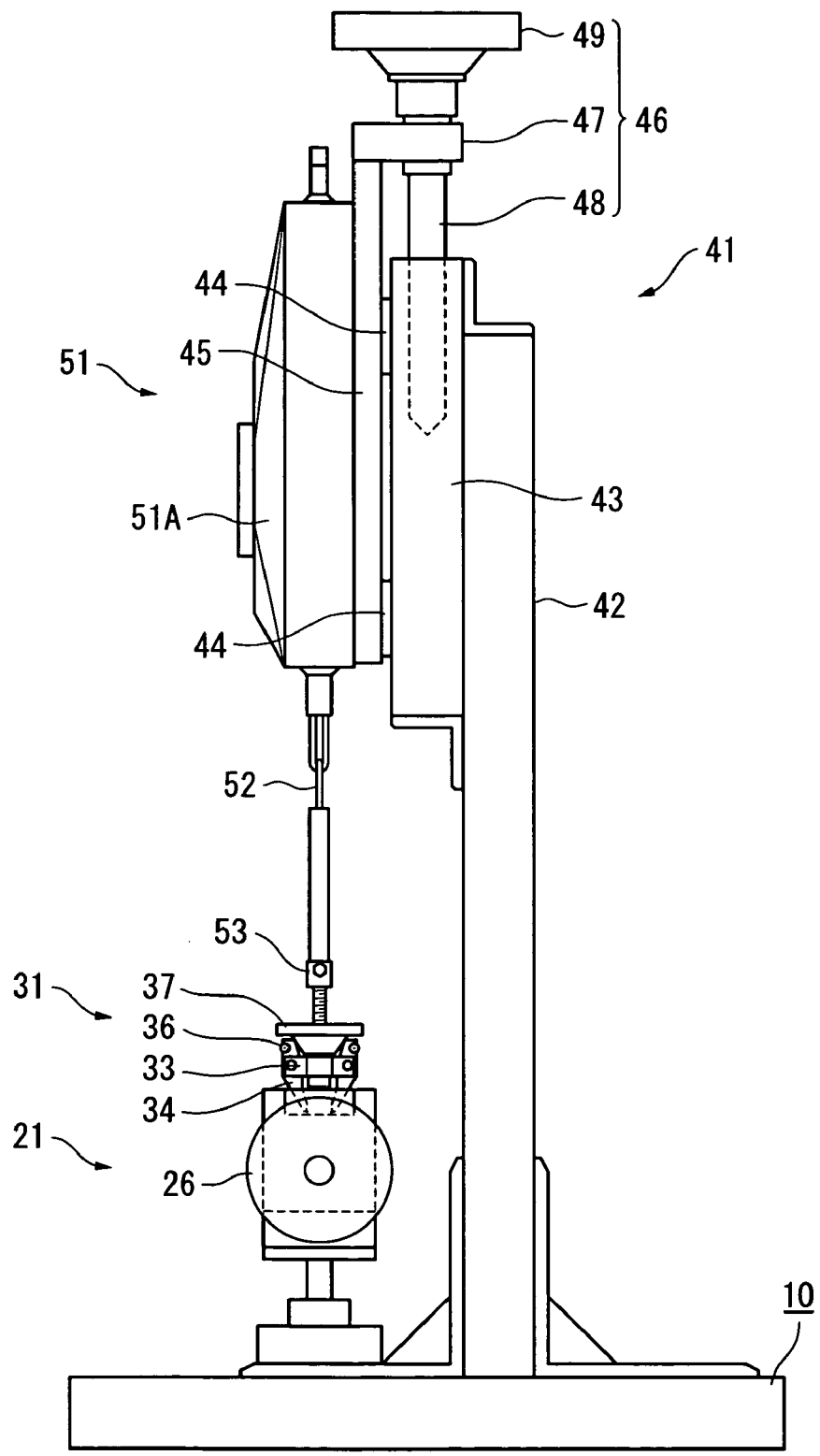
FIG. 10 is a schematic lateral view of the known measuring instrument for detaching force of snap member of FIG. 9.
Figure 11:
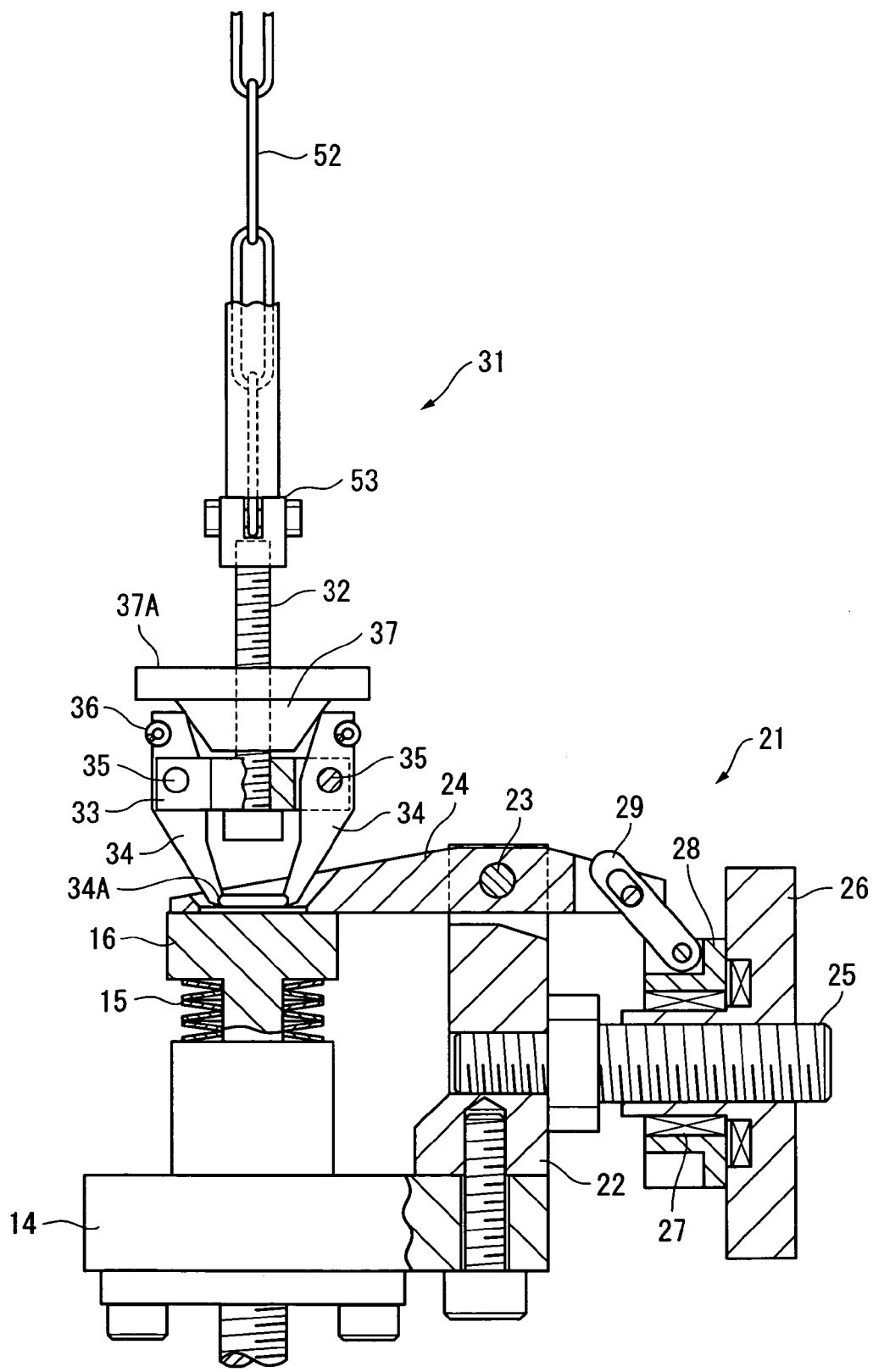
FIG. 11 is a schematic illustration of the constraining means and the means for pressing the fabric of the known measuring instrument for detaching force of snap member of FIG. 10.
Figure 12:
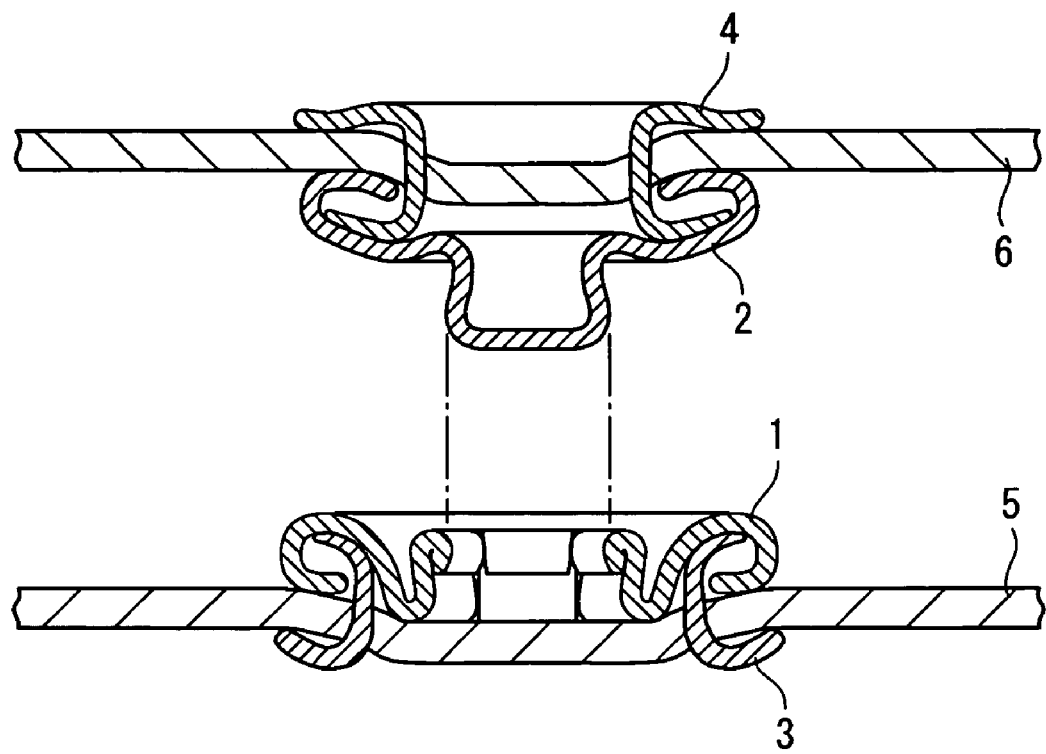
FIG. 12 is a schematic cross sectional view of a snap member.

FIGS. 1 and 2 schematically illustrate a principal part of the embodiment of measuring instrument for detaching force of snap member. This embodiment of measuring instrument for detaching force of snap member differs from conventional measuring instrument for detaching force of snap members (such as a measuring instrument for detaching force of snap member illustrated in FIGS. 9 through 11) in terms of the constraining means and the means for pressing the fabric. This embodiment is same as or similar to known measuring instrument for detaching force of snap members in terms of the remaining components. In the following description, the components that are same as or similar to those illustrated in FIGS. 9 through 11 are denoted respectively by the same reference symbols and will be described only briefly or will not be described any further.

The constraining means 61 of this embodiment includes a threaded bolt 32 linked to a chain 52 extending downward from the gauging means 51 by way of a joint 53, a jaw support plate 33 arranged at the lower end of the threaded bolt 32 so as to operate as support member, three jaws 34 arranged to surround the snap member and having at the front ends thereof respective engaging portions 34A adapted to be engaged with the sides of the snap member, support shafts 35 rotatably holding middle portions of the jaws 34 to the jaw support plate 33 so as to allow the front end engaging portions 34A of the jaws 34 to spread and become closed, turning/biasing means 36 that are the first biasing means for turning/biasing the respective jaws 34 around the corresponding respective support shafts 35 so as to operate as fulcrums and open the front end engaging portions 34A of the jaws 34, a jaw opening/closing drive members 62 arranged axially movably to surround the threaded bolt 32 in such a way that, when it is moved in the first direction (downward), it presses the base end portions of the jaws 34 and turns the jaws 34 in a direction for closing the front end engaging portions of the jaws 34 and an opening/closing biasing means 63 that is the second biasing means for biasing the jaw opening/closing drive member 62 in the first direction of closing the front end engaging portions of the jaws 34.

The front end engaging portions 34A of the jaws 34 have a concaved inner surface, showing a claw-like profile, that snugly fits the sides of the snap member.

As described above by referring to the prior art, the turning/biasing means 36 may be coil springs, although they may alternatively be annular elastic members such as O-rings or pieces of rubber.

Figure 3:
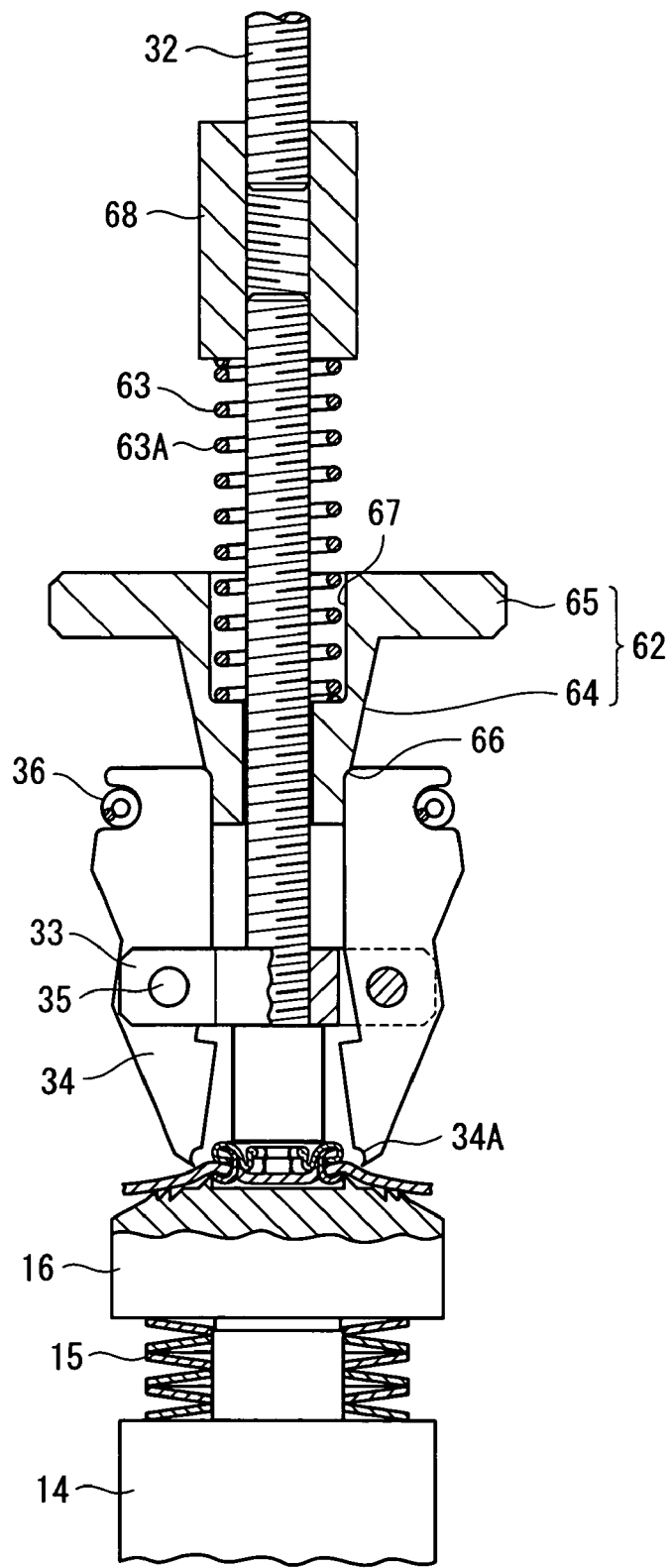
FIG. 3 is a schematic illustration of the embodiment of FIG. 1, showing a state thereof before constraining an object of constraint.
Figure 4:
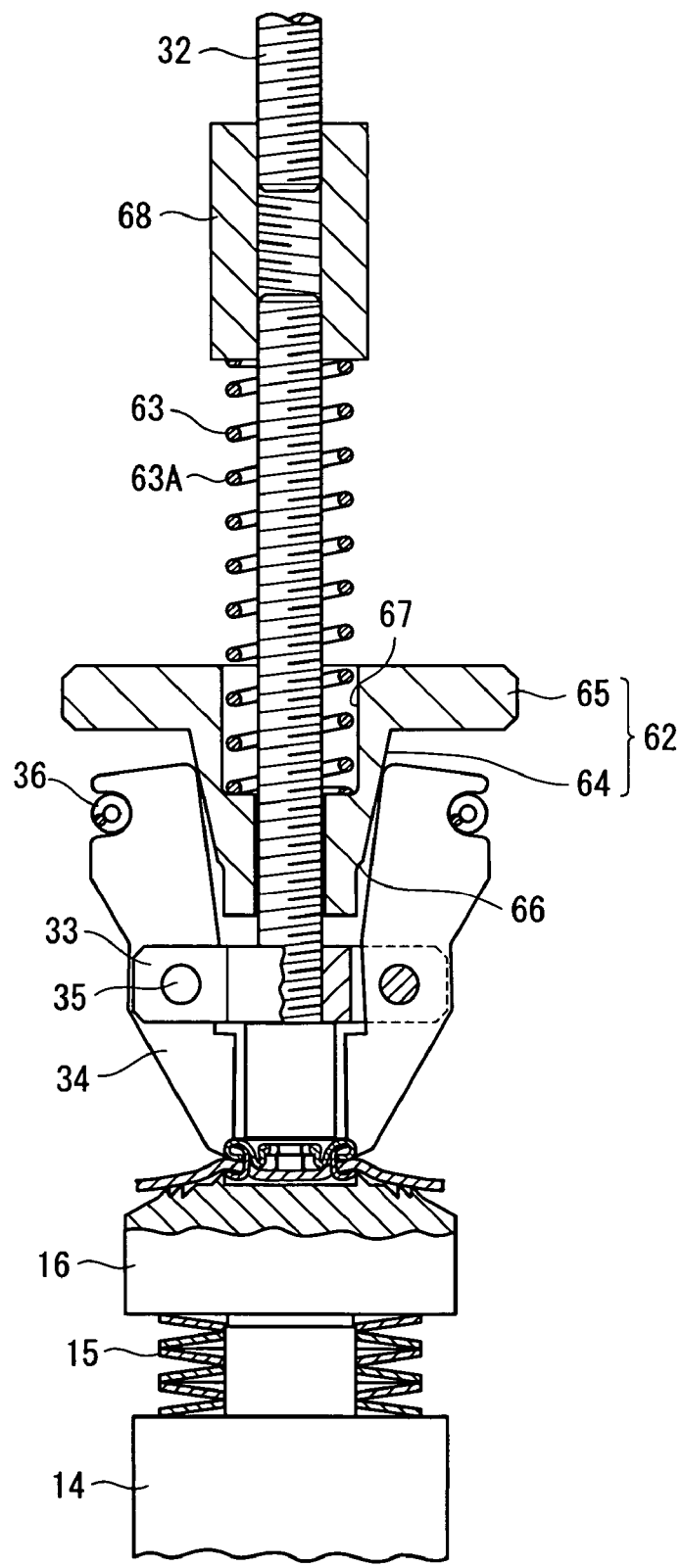
FIG. 4 is a schematic illustration of the embodiment of FIG. 1, showing a state thereof after constraining an object of constraint.

As shown in FIGS. 3 and 4, the jaw opening/closing drive member 62 has a tapered section 64 whose diameter is increased along the (upward) direction opposite to the first direction of movement of the jaw opening/closing drive member 62 and a disk-shaped guard section 65 formed integrally at the large diameter end of the tapered section 64.

The tapered section 64 has a tapered surface that shows an angle between 10 and 80 degrees, which is about 60 degrees in this embodiment, and a temporary holding section 66 at the small diameter end thereof.

The temporary holding section 66 has a diameter smaller than the small diameter end of the tapered section 64 and the stepped section operates as a stepped holding section having a curved surface that is engaged with the inner curved surfaces of the base end portions of the jaws 34 to block the movement of the jaw opening/closing drive member 62 in the first direction caused by the opening/closing biasing means 63. However, when force exceeding a predetermined level is exerted onto the jaw opening/closing drive member 62 in the first direction, the temporary holding section 66 is disengaged from the base end portions of the jaws 34 to allow the jaw opening/closing drive member 62 to move in the first direction.

The guard section 65 has on the top surface thereof a recessed section 67 for receiving the lower end of the opening/closing biasing means 63.

The opening/closing biasing means 63 comprises a coil spring 63A. The coil spring 63A has a lower end that is received in the recessed section 67 and an upper end that abuts a spring abutting piece 68 screwed onto the threaded bolt 32. As the spring abutting piece 68 is rotated and displaced in the axial direction of the threaded bolt 32, the downward biasing force of the coil spring 63A changes. While the threaded bolt 32 is divided into two pieces with the spring abutting piece 68 interposed between them in FIGS. 4 and 5, it may alternatively be realized as one piece.

Figure 5:
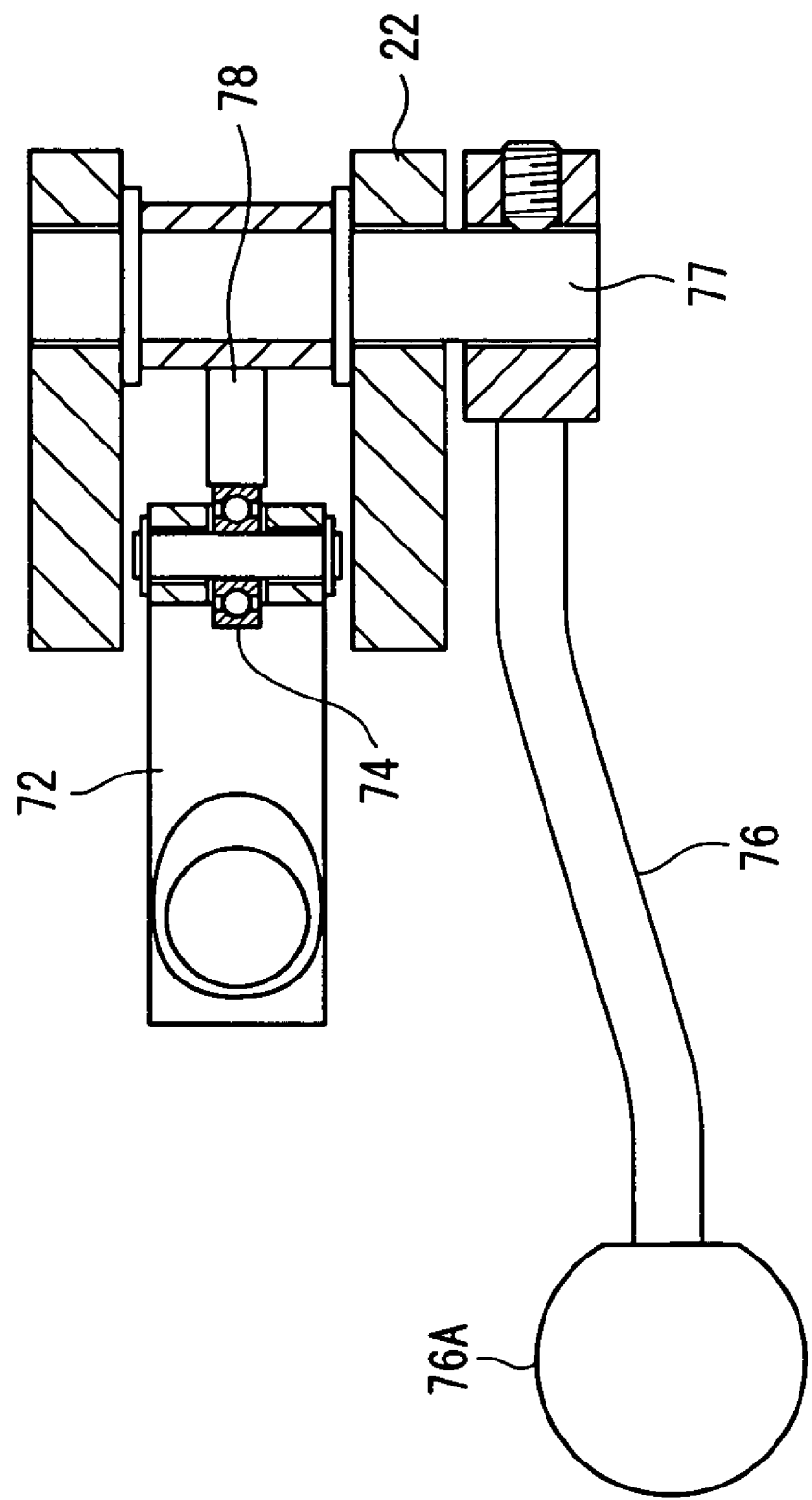
FIG. 5 is a schematic partially cut away view of the embodiment of FIG. 1.

As shown in FIG. 5, the means for pressing the fabric 71 of this embodiment includes a fabric presser arm 72 that is substantially L-shaped and adapted to press the fabric relative to the die 16 at the front end thereof, a support shaft 73 supporting the fabric presser arm 72 to the support member 22 at a middle section of the arm 72 so as to allow the latter to swing, a bearing 74 arranged at the base end side of the fabric presser arm 72, a spring 75 that is arranged between the support member 22 and the fabric presser arm 72 and operates as biasing means for biasing the front end of the fabric presser arm 72 to move away from the top surface of the die 16, a rotary shaft 77 held in parallel with the support shaft 73 by the support member 22 and having a lever 76 at an end thereof and a cam 78 arranged to the rotary shaft 77 and adapted to cause the base end of the fabric presser arm 72 to swing around the support shaft 73 that operates as fulcrum as the lever 76 is operated to turn. Note that the die 16 is supported by a resilient spring section 15 that is a resilient member adapted to be resiliently displaced in the directions for pressing the fabric (upward and downward directions). The resilient spring section 15 is not limited to a leaf spring as described above. It may alternatively be formed by using a coil spring, rubber or urethane.

As the lever 76 is turned from position (A) to position (B) in FIG. 2 (counterclockwise in FIG. 2), the cam 78 does not contact the bearing 74 until the lever is turned by a predetermined angle but eventually comes to contact the bearing 74. Then, the cam 78 produces a cam curve that makes the fabric presser arm 72 turn counterclockwise in FIG. 2. The cam 78 is provided with a stopper section 78A that is engaged with the bearing 74 to block the lever 76 against turning further when the lever 76 gets to position (B) in FIG. 2.

More specifically, the cam 78 is profiled in such a way that it abuts the bearing 74 of the fabric presser arm 72 before the stopper section 78A abuts the bearing 74 of the fabric presser arm 72 and the fabric presser arm 72 is made to swing slightly in the opposite direction when (or immediately before) the stopper section 78A abuts the bearing 74 of the fabric presser arm 72, whereas the force with which the bearing 74 of the fabric presser arm 72 pushes the cam 78 is substantially directed in the direction of the rotary shaft 77 when the stopper section 78A abuts the bearing 74 of the fabric presser arm 72.

The lever 76 has a grip ball 76A at the front end thereof and the distance between the rotary shaft 77 and the grip ball 76A is made sufficiently large.

Now, the operation of this embodiment of measuring instrument for detaching force of snap member for gauging the necessary force for detaching the snap member will be described below.

Firstly, a snap member attached to a piece of fabric is placed on the top surface of the die 16 and, under this condition, the fabric is pressed against the top surface of the die 16 around the snap member by means of the means for pressing the fabric 71. To do this, the lever 76 is turned from position (A) to position (B) in FIG. 2. Then, the fabric presser arm 72 is turned counterclockwise in FIG. 2 by the cam 78 and, as a result, the fabric is pressed around the snap member by the front end of the fabric presser arm 72.

At this time, the cam 78 abuts the bearing 74 of the fabric presser arm 72 before the stopper section 78A abuts the bearing 74 of the fabric presser arm 72 so that, when the stopper section 78A abuts the bearing 74 of the fabric presser arm 72, the fabric presser arm 72 is made to show a profile of a cam that is adapted to slightly swing in the opposite direction. Thus, as the cam 78 abuts the bearing 74 of the fabric presser arm 72 firstly, the resilient spring section 15 supporting the die 16 is compressed to swing the fabric presser arm 72 in the same direction. As the cam 78 is turned further, the resilient spring section 15 supporting the die 16 expands until the stopper section 78A of the cam 78 abuts the bearing 74 of the fabric presser arm 72. Therefore, the operator can feel that the fabric presser arm 72 is brought to the right position because the necessary force for pressing the lever 76 is reduced before the stopper section 78A abuts the bearing 74.

When the fabric presser arm 72 is brought to the right position and hence the stopper section 78A of the cam 78 abuts the bearing 74 of the fabric presser arm 72, the force pressing the bearing 74 of the fabric presser arm 72 is directed substantially in the direction of the rotary shaft 77. Therefore, if the operator releases the lever 76 from the hand, none of the lever 76, the rotary shaft 77 and the cam 78 will return to the original position. Additionally, since the force pressing the fabric is made to exceed 200N by the weight of the lever 76, that of the grip ball 76A and the length between the rotary shaft 77 and the grip ball 76A, the fabric can be reliably pressed by the front end of the fabric presser arm 72.

Subsequently, the sides of the snap member is constrained by the constraining means 61. At this time, force exceeding a predetermined level is applied to the jaw opening/closing drive member 62 to press the latter downward in a state where the jaw opening/closing drive member 62 is blocked against moving downward by the temporary holding section 66. Then, the temporary holding section 66 and the inner curved surfaces of the base end portions of the jaws 34 are disengaged from each other and the temporary holding section (stepped holding section) 66 is pushed downward beyond the base end portions of the jaws 34 so that consequently the jaw opening/closing drive member 62 is moved downward. Then, as shown in FIG. 4, the tapered section 64 of the jaw opening/closing drive member 62 presses the base end portions of the jaws 34 to turn the jaws 34 around the respective support shafts 35 that operate as fulcrums in the respective directions of closing the front end engaging portions 34A of the jaws 34. As a result, the front end engaging portions 34A of the jaws 34 come to be engaged with the sides of the snap member as they are closed so that the snap member is constrained. In other words, the snap member is constrained when downwardly directed force exceeding a predetermined level is applied to the jaw opening/closing drive member 62 and hence the operator is not required to bear any burden for reliably constraining the snap member.

Thereafter, the snap member is pulled substantially rectangularly relative to the attaching surface by way of the pulling means 41. Then, the pulling force of the pulling means 41 is gauged by the gauging means 51. Thus, the necessary force for detaching the snap member can be accurately gauged with a reduced load on the part of the operator.

For the snap member to be released from the jaws 34, the front end engaging portions 34A of the jaws 34 need to be spread apart. Because the tapered section 64 of the jaw opening/closing drive member 62 that abuts the base end portions of the jaws 34 shows an angle of about 30 degrees, the upwardly directed component of force applied to the jaw opening/closing drive member 62 by the base end portions of the jaws 34 is small so that the snap member is not released from the jaws 34 if the snap member detaching force is greater than 200N. Therefore, the gauging operation can be conducted safely.

On the other hand, the jaw opening/closing drive member 62 is pulled upward to release the snap member held by the jaws 34 after the operation of gauging the snap member detaching force. At this time, since the coil spring 63A pressing the jaw opening/closing drive member 62 downward is fully expanded, only a small force is required to pull the jaw opening/closing drive member 62 upward. Thereafter, the force pulling up the jaw opening/closing drive member 62 gathers momentum so that the temporary holding section 66 can pass over the base end portions of the jaws 34 with little effort. After the temporary holding section 66 passes over the base end portions of the jaws 34, the jaw opening/closing drive member 62 is released. Then, the temporary holding section 66 of the jaw opening/closing drive member 62 is held by the base end portions of the jaws 34 to restore the state before constraining the snap member.

Thus, with this embodiment, when a snap member is constrained by the constraining means 61, the operator is only required to downwardly exert force exceeding a predetermined level in order to release the jaws from the temporarily held state and constrain the snap member. On the other hand, the snap member can be released by applying a light force to the jaw opening/closing drive member 62 in order to raise the latter and keep the jaws in a temporarily held state. Thus, the snap member can be reliably constrained and released without putting a burden on the operator.

Since the means for pressing the fabric 71 includes a fabric presser arm 72 adapted to press a piece of fabric at the front end thereof, a support shaft 73 supporting the fabric presser arm 72 at a middle section of the arm 72 so as to allow the latter to swing, a rotary shaft 77 held in parallel with the support shaft 73 and having a lever 76 and a cam 78 arranged to the rotary shaft 77 and adapted to cause the base end of the fabric presser arm 72 to swing around the support shaft 73 that operates as fulcrum as the lever 76 is operated to turn, the fabric can be held with little effort without putting a burden on the part of the operator.

Additionally, when the stopper section 78A of the cam 78 abuts the bearing 74 of the fabric presser arm 72, the force pressing the bearing 74 of the fabric presser arm 72 against the cam 78 is directed substantially in the direction of the rotary shaft 77. Therefore, if the operator releases the lever 76 from the hand, none of the lever 76, the rotary shaft 77 and the cam 78 will return to the original position. Still additionally, since the force pressing the fabric is made to exceed 200N by the weight of the lever 76, that of the grip ball 76A and the length between the rotary shaft 77 and the grip ball 76A, the fabric can be reliably pressed by the front end of the fabric presser arm 72.

Still additionally, the cam 78 abuts the bearing 74 of the fabric presser arm 72 before the stopper section 78A abuts the bearing 74 of the fabric presser arm 72 so that, when the stopper section 78A abuts the bearing 74 of the fabric presser arm 72, the fabric presser arm 72 is made to show a profile of a cam that is adapted to slightly swing in the opposite direction. Thus, as the cam 78 abuts the bearing 74 of the fabric presser arm 72 firstly, the resilient spring section 15 supporting the die 16 is compressed to swing the fabric presser arm 72 in the same direction. As the cam 78 is turned further, the resilient spring section 15 supporting the die 16 expands until the stopper section 78A of the cam 78 abuts the bearing 74 of the fabric presser arm 72. Therefore, the operator can feel that the fabric presser arm 72 is brought to the right position because the necessary force for pressing the lever 76 is reduced before the stopper section 78A abuts the bearing 74.

Note that the embodiment can be applied to a variety of fabrics having different thicknesses because the die 16 is supported by the resilient spring section 15 in such a way that it can be resiliently displaced in the direction of pressing the fabric.

Still additionally, the spring 75 is arranged as biasing means for biasing the front end of the fabric presser arm 72 of the means for pressing the fabric 71 to move away from the top surface of the die 16, a gap is secured between the front end of the fabric presser arm 72 and the top surface of the die 16 so that a piece of fabric can be inserted through the gap without difficulty.

Furthermore, in a state where the snap member is constrained by the constraining means 61 and the fabric is pressed around the snap member by the means for pressing the fabric 71, the snap member is pulled substantially rectangularly relative to the attaching surface by way of the pulling means 41. Then, the pulling force of the pulling means 41 is gauged by the gauging means 51. Thus, the necessary force for detaching the snap member can be accurately gauged with a reduced load on the part of the operator.

The present invention is by no means limited to the above described embodiment of measuring instrument for detaching force of snap member, which may be modified in a manner as described below.

While a single temporary holding section 66 is provided in the above embodiment, a number of temporary holding sections 66 may be arranged along the axial direction of the jaw opening/closing drive member 62.

In the above embodiment, the tapered section 64 of the jaw opening/closing drive member 62 is made to have a diameter that gradually increases in the opposite direction (upward) that is opposite to the first direction (downward) of movement of the jaw opening/closing drive member 62. Alternatively, it may be so arranged that the tapered section 64 has a diameter that gradually decreases in the opposite direction or the upward direction and the jaw opening/closing drive member 62 is biased in the opposite direction (upward) by the opening/closing biasing means 63.

With such an configuration, as force exceeding a predetermined level is applied in the second direction (upward) to the jaw opening/closing drive member 62 in a state where the jaw opening/closing drive member 62 is blocked against moving upward by the temporary holding section 66, the temporary holding section 66, the base end portions of the jaws 34 are disengaged from each other so that the jaw opening/closing drive member 62 is moved in the second direction (upward) by the biasing force of the opening/closing biasing means 63. As a result, the jaws 34 are turned in respective directions of closing the front end engaging portions 34A of the jaws 34. Thus, this modified configuration provides advantages similar to those of the above described embodiment.

Additionally, the temporary holding section 66 may have any different configuration so long as it can temporarily block the jaw opening/closing drive member 62 against moving in the first direction and the temporarily blocked state can be released with little effort.

For example, the surface of the (lower) end of the jaw opening/closing drive member 62 as viewed in the first direction may be made to show undulations or coarse to provide a friction surface which is frictionally engaged with the base end portions of the jaws 34 to operate as friction-holding portion such a friction-holding section may alternatively be formed by using an engaging O-ring that is typically made of rubber in place of a friction surface having undulations or a coarse friction surface.

Figure 6:
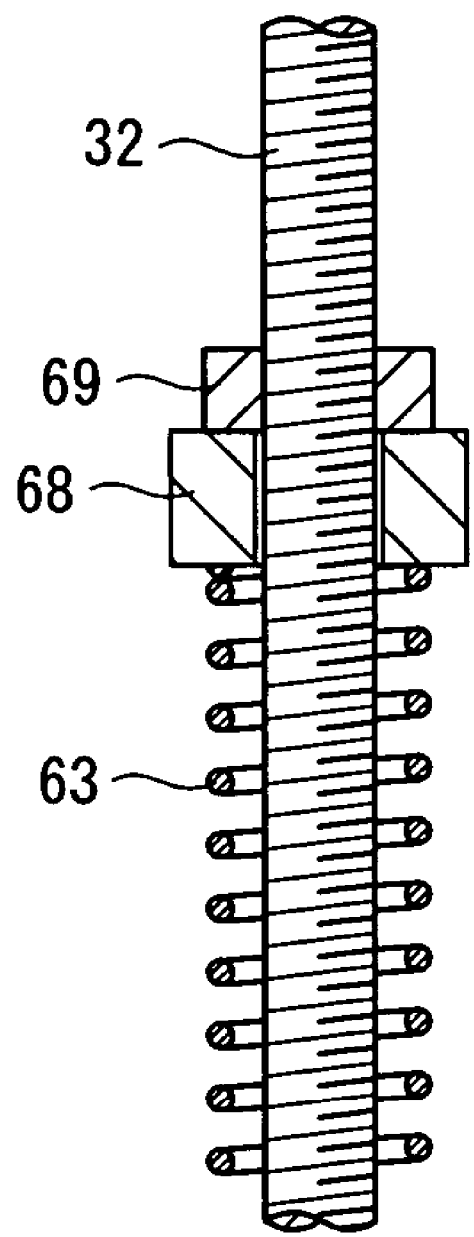
FIG. 6 is a schematic illustration of a modified means for rigidly holding the spring abutting piece to the threaded bolt of the embodiment of FIG. 1.
Figure 7:
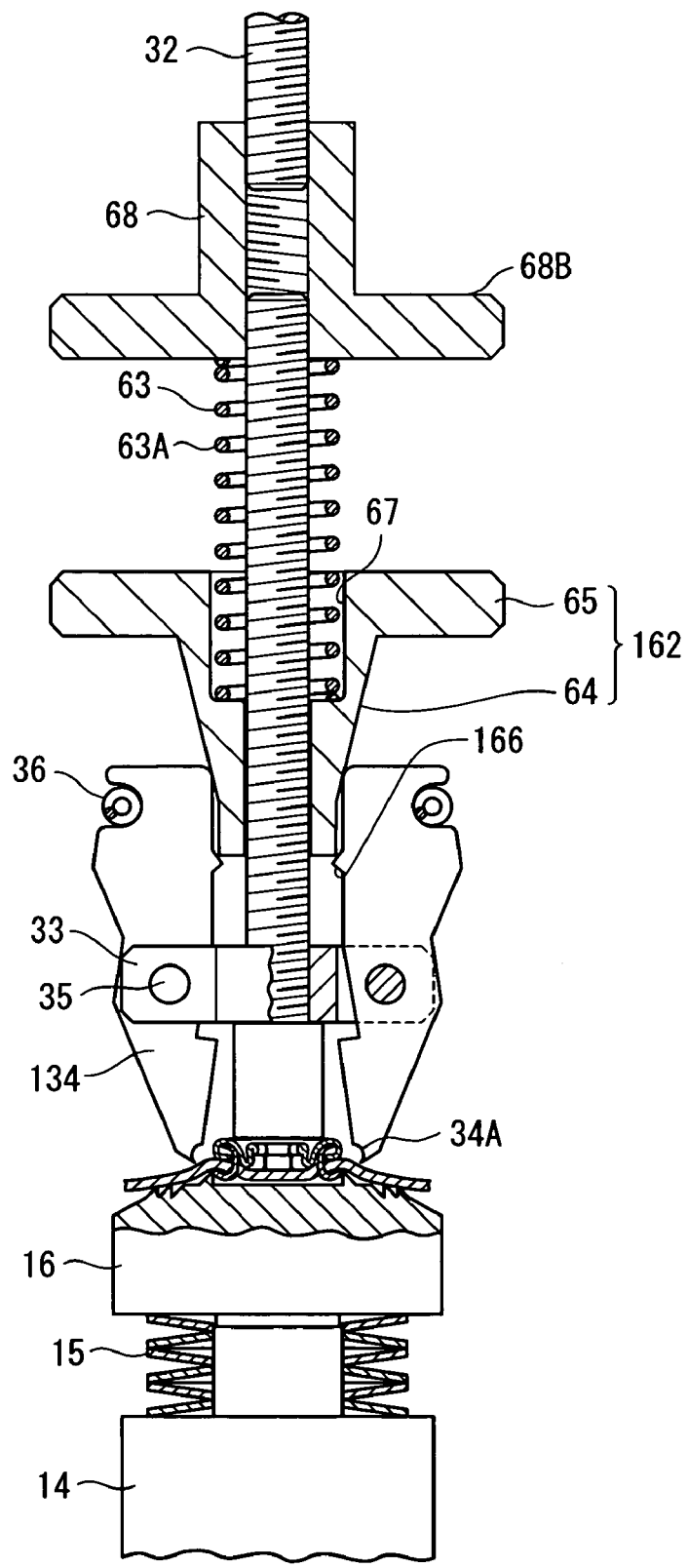
FIG. 7 is a schematic illustration of another embodiment, showing a state thereof before constraining an object of constraint.
Figure 8:
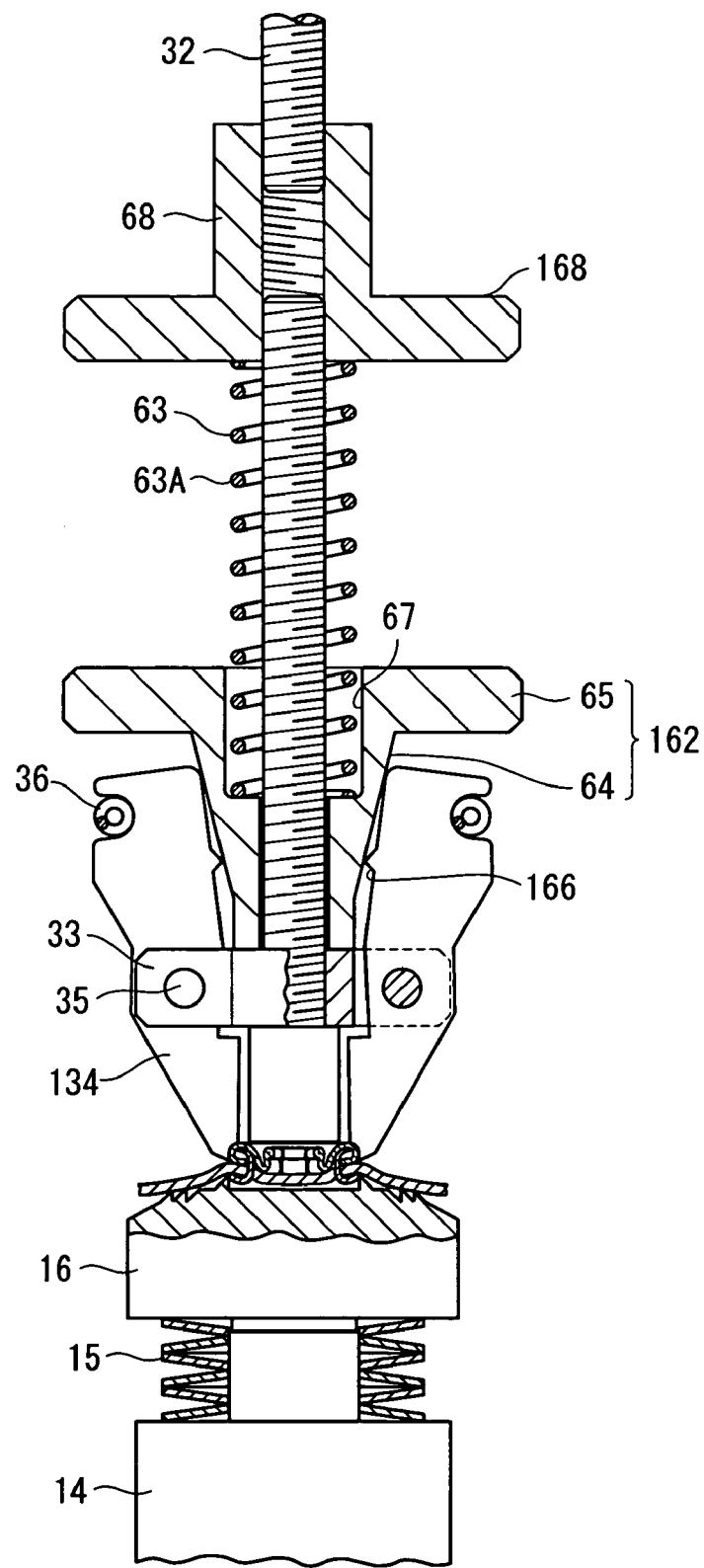
FIG. 8 is a schematic illustration of the embodiment of FIG. 7, showing a state thereof after constraining an object of constraint.

FIGS. 7 and 8 illustrate another embodiment of the present invention. The components of this embodiment other than the jaw opening/closing drive member 62, the jaws 34 and the spring abutting piece 68 are same as those of the embodiment of FIGS. 1 through 6 and hence will not be described any further.

The jaw opening/closing drive member 162 is provided with a tapered section 64 and a guard section 65 as in the case of the above described embodiment. However, no stepped temporary holding section 66 is formed at the front end side of the tapered section 64. Instead, a projecting temporary holding section 166 is formed at the inside of each of the jaws 34.

Referring to FIG. 7, the temporary holding sections 166 formed respectively at the insides of the corresponding jaws 34 are engaged with the peripheral edge of the front end of the jaw opening/closing drive member 162. With this configuration, while the jaw opening/closing drive member 162 is biased in the first direction (downward) by the opening/closing biasing means 63, it is engaged with and temporarily held by the temporary holding sections 166. Under this condition, the base end sides of the jaws 34 contact a relatively narrow area of the tapered section 64 so as to be apt to slide there and the front end engaging portions 34A are held in a state of being spread apart.

Referring to FIG. 8, as the jaw opening/closing drive member 162 that is temporarily held is pushed in the first direction (downward), the temporary holding sections 166 are disengaged from the front end section of the jaw opening/closing drive member 162 so that the jaw opening/closing drive member 162 moves in the first direction (downward) relative to the jaws 34 and the base ends of the jaws 34 slide along the tapered section 64 and spread apart relative to each other (the temporary holding sections 166 of the jaws 34 slide along the tapered section 64 from respective predetermined positions and spread apart relative to each other in this embodiment) so that the jaws 34 are turned and their front end engaging portions 34A become closed.

Thus, this configuration provides advantages similar to those of the above described embodiment.

Note that a guard section 68A is formed at the spring abutting piece 68 in the embodiment of FIGS. 7 and 8. Therefore, this embodiment provides an additional advantage that the operation of bringing the spring abutting piece 68 and the jaw opening/closing drive member 162 close to each other against the opening/closing biasing means 63 can be performed easily by the operator by grasping the guard section 65 of the jaw opening/closing drive member 162 and the guard section 68A of the spring abutting piece 68 by one hand.

The temporary holding section may be also modified in a manner as described below.

If the frictional force generated at the sliding/contacting area of the jaw opening/closing drive member 62 and those of the jaws 34 is sufficiently large for temporarily blocking the relative movement of the jaw opening/closing drive member 62 and the jaws 34, it is not necessary to provide the constraining means 61 with a temporary holding section. Alternatively, the relative movement of the jaw opening/closing drive member 62 and the jaws 34 can be blocked temporarily by using a clip or the like. In short, the provision of such a temporary holding section is not indispensable for the purpose of the invention.

If the constraining means 61 is not provided with a temporary holding section, an operation of constraining and releasing can be performed as in the case of the above described embodiments to provide advantages similar to those of the embodiments provided that the temporary holding effect is realized by friction or the like.

Additionally, if the constraining means 61 is not designed to perform a temporary holding operation unlike the above described embodiments, the object of constraint can be released from a constrained state by pushing up the opening/closing biasing means 63 and brought back into a constrained state by suspending the effort of pushing up the opening/closing biasing means 63. Therefore, from this point of view, the present invention provides a remarkable advantage of ease of operation if compared with conventional screw type gauges.

While the constraining means 61 is pulled in a direction of moving away relative to the means for pressing the fabric 71 in each of the above described embodiments, conversely the means for pressing the fabric 71 may be pulled in a direction of moving away relative to the constraining means 61. Alternatively, both the constraining means 61 and the means for pressing the fabric 71 may be pulled so as to be moved away relative to each other.

While the threaded bolt 32 is divided into two parts and linked by the spring abutting piece 68 in each of the above described embodiments, the threaded bolt 32 may be used without dividing it as shown in FIG. 6. Then, the threaded bolt 32 is made to pass through the spring abutting piece 68 in such a way that the latter can move relative to the former and the spring abutting piece 68 can be rigidly held to a desired position on the threaded bolt 32 by means of a nut 69 that is screwed onto the threaded bolt 32.

Additionally, the present invention is not limited to measuring instrument for detaching force of snap members as described above by way of embodiments and can be applied to constraining devices that comprise only a constraining means.

For example, in a situation where a bolt is screwed onto a member by means of a part assembling apparatus, a constraining device according to the invention may be used as a component of the assembling apparatus in such a way that the head of the bolt is constrained by the constraining means 61, which is subsequently driven to rotate by a rotating/driving means. A constraining device according to the invention may also be used for catching a wafer in a wafer transporting means.

INDUSTRIAL APPLICABILITY

The present invention can be applied to a constraining device for constraining an object of constraint such as a snap member attached to a piece of fabric and also to a measuring instrument for detaching force of snap member for gauging the necessary force for detaching the snap member attached to a piece of fabric.

The invention claimed is:

1. A constraining device for constraining an object, comprising:
   a support member,
   a plurality of jaws adapted to be arranged around said object of constraint and having at the front ends thereof respective engaging portions to be engaged with the sides of the object of constraint;
   support shafts rotatably supporting the respective jaws at middle portions of the latter so as to allow the front end engaging portions of the jaws to spread and become closed;
   first biasing means for biasing the respective jaws to rotate around the respective support shafts operating as fulcrums so as to bring the front end engaging portions of said jaws into an open state;
   a jaw opening/closing drive member arranged internally relative to said plurality of jaws and adapted to move so as to make the jaws contact or release said object of constraint and rotate the jaws so as to press the base end portions of the jaws and close the front end engaging portions of the jaws when moved in a direction of causing the jaws to contact the object of constraint or in a direction of causing the jaws to release the object of constraint; and
   a spring as a second biasing means for biasing said jaw opening/closing drive member in a first direction to move the jaw opening/closing drive member in a direction for the front end engaging portions of the plurality of jaws to be closed, so that the jaw is rotated around the respective support shafts as fulcrum.

2. The constraining device according to claim 1, wherein either said jaw opening/closing drive member is provided with a temporary holding section adapted to be engaged with the base end portions of said jaws or said jaws are provided with respective temporary holding sections adapted to be engaged with the front end section of said jaw opening/closing drive member so as to block the movement of said jaw opening/closing drive member in the first direction caused by said second biasing means but become disengaged to allow the movement of said jaw opening/closing drive member in the first direction when force exceeding a predetermined level is applied to the jaw opening/closing drive member in the first direction.

3. The constraining device according to claim 2, wherein the temporary holding section is realized as a stepped holding section that is formed at the side of the jaw opening/closing drive member facing the first direction and adapted to be engaged with the base end portions of the jaws.

4. The constraining device according to claim 2, wherein the temporary holding section is formed at the side of the jaw opening/closing drive member facing the first direction and the jaw opening/closing drive member has a tapered section whose diameter is increased along the direction opposite to the first direction from said temporary holding section.

5. The constraining device according to claim 4, wherein the angle of the tapered section is between 10 and 80 degrees.

6. The constraining device according to claim 1, wherein the member holding the base end side of the second biasing means and the jaw opening/closing drive member are provided with respective flanges that can be operated by one hand in a direction approaching the object of constraint to compress the second biasing means.

7. A measuring instrument for detaching force of snap member, comprising:
   a means for pressing the fabric for pressing a fabric of garments attaching a snap member around the snap member;
   a constraining means for constraining the sides of the snap member;
   a pulling means for pulling at least either the constraining means or the means for pressing the fabric in the direction separating the constraining means constraining the snap member and the means for pressing the fabric; and
   a gauging means for gauging the pulling force of the pulling means; said constraining means having:
   a support member;
   a plurality of jaws adapted to be arranged around said snap member and having at the front ends thereof respective engaging portions to be engaged with the sides of the snap member;
   support shafts rotatably supporting the respective jaws at middle portions of the latter so as to allow the front end engaging portions of the jaws to spread and become closed;
   fast biasing means for biasing the respective jaws to rotate around the respective support shafts operating as fulcrums so as to bring the front end engaging portions of said jaws into an open state;
   a jaw opening/closing drive member arranged internally relative to said plurality of jaws and adapted to move so as to make the jaws contact or release said object of constraint and rotate the jaws so as to press the base end portions of the jaws and close the front end engaging portions of the latter when moved in a direction of causing the jaws to contact the object of constraint or in a direction of causing the jaws to release the object on constraint; and a spring as second biasing means for biasing said jaw opening/closing drive member in a first direction to move the jaw opening/closing drive member in a direction for the front end engaging portions of the plurality of jaws to be closed, so that the jaw is rotated around the respective support shafts as fulcrum.

8. The measuring instrument for detaching force of snap member according to claim 7, wherein either said jaw opening/closing drive member is provided with a temporary holding section adapted to be engaged with the base end portions of said jaws or said jaws are provided with respective temporary holding sections adapted to be engaged with the front end section of said jaw opening/closing drive member so as to block the movement of said jaw opening/closing drive member in the first direction caused by said second biasing means but become disengaged to allow the movement of said jaw opening/closing drive member in the first direction when force exceeding a predetermined lever is applied to the jaw opening/closing drive member in the first direction.

9. The measuring instrument for detaching force of snap member according to claim 8, wherein the temporary holding section is realized as a stepped holding section that is formed at the side of the jaw opening/closing drive member facing the first direction and adapted to be engaged with the base end portions of the jaws.

10. The measuring instrument for detaching force of snap member according to claim 8, wherein the temporary holding section is formed at the side of the jaw opening/closing drive member facing the first direction and the jaw opening/closing drive member has a taper section whose diameter is increased along the direction opposite to the first direction from said temporary holding section.

11. The measuring instrument for detaching force of snap member according to claim 10, wherein the angle of the tapered section is between 10 and 80 degrees.

12. The measuring instrument for detaching force of snap member according to claim 7, wherein the member holding the base end side of the second biasing means and the jaw opening/closing drive member are provided with respective flanges that can be operated by one hand in a direction approaching the object of constraint to compress the second biasing means.

13. The measuring instrument for detaching force of snap member according to claim 7, wherein the means for pressing the fabric has a fabric presser arm adapted to press the fabric at the front end thereof, a support shaft supporting the fabric presser arm at a middle section of the arm so as to allow the latter to swing, a rotary shaft held in parallel with the support shaft and having a lever and a cam arranged at the rotary shaft so as to swing the base end of the fabric presser arm around the support shaft that operates as fulcrum according to the operation of turning the lever.

14. The measuring instrument for detaching force of snap member according to claim 13, wherein the cam has a stopper section adapted to abut the base end of the fabric presser arm is caused to swing in the direction for pressing the fabric and to direction of force in which the base end of the fabric presser arm pushes the cam substantially agrees with the direction of the rotary shaft when the stopper section abuts the base end of the fabric presser arm.

15. The measuring instrument for detaching force of snap member according to claim 14, farther comprising:

a die adapted to press the fabric between itself and the front end of the fabric presser arm and a resilient member supporting the die so as to allow the die to be resiliently displaced in the direction of the pressing the fabric; the cam being so profiled that it abuts the base end of the baric presser arm before the stopper section abuts the base end of the fabric presser arm and the fabric presser arm slightly swings in the opposite direction when the stopper section abuts the base end of the fabric presser arm.

16. A measuring instrument for detaching force of snap member comprising:

a means for pressing the fabric for pressing a fabric of garments attaching a snap member around the snap member;

a constraining means for constraining the sides of the snap member;

a pulling means for pulling at least either the constraining means or the means for pressing the fabric in the direction separating the constraining means constraining the snap member and the means for pressing the fabric; and a gauging means for gauging the pulling force of the pulling means;

said means for pressing the fabric having:

a fabric presser arm adapted to press the fabric at the front end thereof;

a support shaft supporting the fabric presser arm at a middle section of the arm so as to allow the latter to swing;

a rotary shaft held in parallel with the support shaft and having a lever; and a cam arranged at the rotary shaft so as to swing the base end of the fabric presser arm around the support shaft that operates as fulcrum according to the operation of turning the lever, wherein the cam has a stopper section adapted to abut the base end of the fabric presser arm when the fabric presser arm is caused to swing in the direction for pressing to fabric and the direction of force in which the base end of the fabric presser arm pushed the cam substantially agrees with the direction of the rotary shaft when the stopper section abuts the base end of the fabric presser arm.

17. The measuring instrument for detaching force of snap member according to claim 16, further comprising:

a die adapted to press the fabric between itself and the front end of the fabric presser arm and a resilient member supporting the die so as to allow the die to be resiliently displaced in the direction of pressing the fabric;

the cam being so profiled that it abuts the base end of the fabric presser arm before the stopper section abuts the base end of the fabric presser arm and the fabric presser arm slightly swings in the opposite direction when the stopper section abuts the base end of the fabric presser arm.

* * * * *